United States Patent [19]

Outland

[11] Patent Number: 4,934,918
[45] Date of Patent: Jun. 19, 1990

[54] CORE COOLING APPARATUS FOR AN INJECTION MOLDING MACHINE

[75] Inventor: Daniel J. Outland, Phoenix, Ariz.

[73] Assignee: UPT Holdings, Inc., Scottsdale, Ariz.

[21] Appl. No.: 319,065

[22] Filed: Mar. 6, 1989

[51] Int. Cl.⁵ .............................................. B29C 45/73
[52] U.S. Cl. ...................................... 425/144; 249/63; 249/79; 425/547; 425/577
[58] Field of Search ...................... 249/63, 64, 79, 141; 425/144, 438, 547, 548, 552, 577; 264/40.6, 328.14, 328.16

[56] References Cited

U.S. PATENT DOCUMENTS

| | | |
|---|---|---|
| 3,169,272 | 2/1965 | Maxson . |
| 3,357,057 | 12/1967 | Bucy . |
| 3,419,244 | 12/1968 | Hedgewick ............................ 249/79 |
| 3,555,620 | 1/1971 | Bucy . |
| 3,667,248 | 6/1972 | Carlson . |
| 4,091,069 | 5/1978 | Allen . |
| 4,151,243 | 4/1979 | Allen .................................. 264/219 |
| 4,212,623 | 7/1980 | Allen .................................. 425/547 |
| 4,238,106 | 12/1980 | Willingham ........................... 249/79 |
| 4,275,864 | 6/1981 | Richards ............................... 249/79 |
| 4,446,084 | 5/1984 | Rowley ................................ 264/40.6 |
| 4,655,280 | 4/1987 | Takahashi ............................ 165/47 |

Primary Examiner—Jill L. Heitbrink
Attorney, Agent, or Firm—LaValle D. Ptak

[57] ABSTRACT

A cooling apparatus for an injection molding machine, which is used to form hollow parts, employs mating mold dies with first and second corresponding hollow core members attached to the dies and extending into the mold cavity. When the cavity is closed, the hollow core members engage to form a continuous cooling fluid passageway through them. During the molding operation, liquid cooling fluid is supplied under pressure to flow through this passageway. At the end of the molding cycle, the flow of cooling fluid is blocked and a second valve is opened to admit air into the passageway near the point where the two hollow core members engage. A vacuum is applied to the opposite ends of both of the hollow core members to pull any cooling fluid and air from the junction between the core members and away from the junction back through the core members. This is a reverse flow or suction of the cooling fluid out of both of the core members just prior to and during the opening of the mold and disengagement of the core members. The injection of air at the point of separation also facilitates the purging of cooling fluid away from the junction of the core members to prevent contamination of the part formed in the mold.

10 Claims, 3 Drawing Sheets

CORE COOLING APPARATUS FOR AN INJECTION MOLDING MACHINE

BAGKGROUND

Plastic injection molding apparatus is widely used to produce parts of many sizes and configurations for nearly limitless numbers of applications. Injection molded plastic products have become commonplace, and substantial industries have developed for the manufacture of such products.

Plastic injection molding machines for making molded plastic products typically employ two or more mating dies which have a hollow interior or mold cavity to form the parts. In their simplest forms, first and second dies are moved toward one another to close the mold and are moved away from one another in a straight line to open the mold for removal of the part.

Injection molding requires the plastic, out of which the part is to be formed, to be injected or poured into the mold in a hot molten state. It is desirable to cool the mold and the plastic within it as quickly as possible after the mold cavity has been filled, to permit removal of the part without distortion. Because of the relatively high temperatures encountered, the dies of such molds frequently include cooling channels through which a suitable cooling fluid is circulated during operation of the mold. The production rate of any particular injection molding machine is directly affected by the rapidity with which the molded parts are cooled to a temperature suitable for their removal from the mold.

Many molded plastic parts have a hollow interior or are formed with a passageway through them. To manufacture such parts, a core pin or one or more mating core pins in each of the dies forming the mold extend into the mold cavity to create the necessary hollow interior. For parts where a large core pin is possible, such as where a relatively large hollow portion is to be formed in the part, cooling of the interior core pin is effected by manufacturing the core pin in a hollow configuration and then spraying the interior of the pin with a suitable cooling solution such as water.

With extremely small diameter core pins used to form the inside dimensions of small precision plastic parts, it is not possible to use this spraying or fountain technique for cooling the core pins. In the past, recognition of this limitation has lead to the utilization of stainless steel core pins coupled to a suitable external heat sink, and the cycle time of the molding machine is lengthened sufficiently to permit dissipation of the heat by conduction through the core pins to the external heat sink. While it is possible to produce suitable precision plastic parts with such a machine, the relatively long cycle times cause the production rate for any given injection molding machine making such parts to be relatively low.

In addition, when stainless steel core pins undergo a relatively wide range of temperatures, the expansion and contraction of the core pins themselves create problems in obtaining high quality precision plastic parts from the machine. This is a universal problem with injection molding machines used to form small precision parts.

To overcome the problem, it has been proposed to make the core pins hollow and to cause water or other suitable coolant to flow through them during the injection molding process. It then is necessary, however, to terminate the water flow at the time the mold is opened to withdraw the core pins and strip the parts from them. Even though the water flow is turned off, small amounts of water in prior art devices dribble from the parting line of the core pins and contaminate the mold interior and the parts themselves. This is a major problem, even though the water cooling does offer a solution to the cooling problem.

An effort to provide flow-through water cooling for molding precision plastic parts, and also to limit the dribbling of the water when the mold is opened, is attempted in the cooling system disclosed in the two patents to Allen U.S. Pat. No. 4,151,243 and U.S. Pat. No. 4,212,623. The apparatus disclosed in both of these patents is identical. This apparatus is directed to a flow-through cooling system for forming a continuous cooling passageway through two separable injection mold dies when they are closed. During the molding cycle, coolant flows through these dies in a continuous passageway. Just prior to the completion of the molding cycle, a first valve is closed to block the flow of cooling liquid, and a second valve is opened to admit air into the same passageway. A vacuum pump continues to pull whatever fluid (cooling liquid or air) is present in the passageway through the passageway. Air is allowed to flow through to remove the water and then the dies are opened. There is no reverse flow or suction of the cooling fluid out of both dies just prior to the opening of the mold, nor is there injection of air into either one of the dies at the separation line.

Other efforts at providing cooling for injection mold dies are disclosed in the patents to Rowley U.S. Pat. No. 4,446,084; Hedgewick U.S. Pat. No. 3,419,244 and Willingham U.S. Pat. No. 4,238,106. The system disclosed in Rowley has a mold portion in the form of a probe with capillary passageways in it to supply and remove coolant. The Patents to Hedgewick and Willingham both are directed to core pin cooling devices in which coolant follows a helical path around either the outside or the inside of a core pin. No reversal of coolant flow takes place in any of the devices disclosed in these patents.

Accordingly, it is desirable to provide a cooling method and apparatus, particularly for cooling the core pins of plastic injection molds used to form small, hollow, precision plastic parts, which shortens the cycle time of operation of the molds and which significantly reduces the possible contamination of the molds or the parts caused by dribbling of cooling fluid when the mold is opened.

SUMMARY OF THE INVENTION

Accordingly, it is an object of this invention to provide an improved cooling system for injection molding machines.

It is another object of this invention to provide an improved cooling system for the core pins used in injection molding apparatus to provide hollow interiors in molded parts.

It is another object of this invention to provide an improved flow-through cooling system for the core pins of an injection molding machine used to form hollow precision plastic molded parts.

It is a further object of this invention to provide an improved interior cooling system for the core pins of plastic injection molds used to form small, hollow, plastic precision parts which reduces the cycle time for operating the molding machine.

It is still another object of this invention to provide an improved flow-through cooling system for the core pins of a plastic injection mold used to form small precision plastic parts in which the cooling fluid is purged from the core pins at the parting line when the mold is opened to prevent contamination of the mold interior and the parts from the cooling fluid.

In accordance with a preferred embodiment of the invention, a flow-through core cooling system for an injection molding apparatus used to produce hollow parts includes first and second mold dies forming a mold cavity and mounted for a relative movement toward and away from one another to respectively close and open the mold cavity. Corresponding first and second hollow core pins are attached to the first and second mold dies and are moveable with the dies. Each of the hollow core members has ends which extend into the mold cavity to matingly engage with one another when the mold cavity is closed to form a continuous fluid passageway through the core pins. Cooling fluid then flows through this passageway when the mold cavity is closed and during the injection molding operation. After completion of the molding operation, a vacuum fluid removal system is coupled with the opposite ends of both of the hollow core pins to remove fluid from them and to pull the cooling fluid away from the parting line where the ends of the core pins matingly engage one another when the mold is opened.

In a more specific embodiment of the invention, an air tube extends through the fluid passageway in at least one of the hollow core pins to inject air at a point adjacent the parting line of the core pins when the mold is opened.

DETAILED DESCRIPTION

Figure 1:
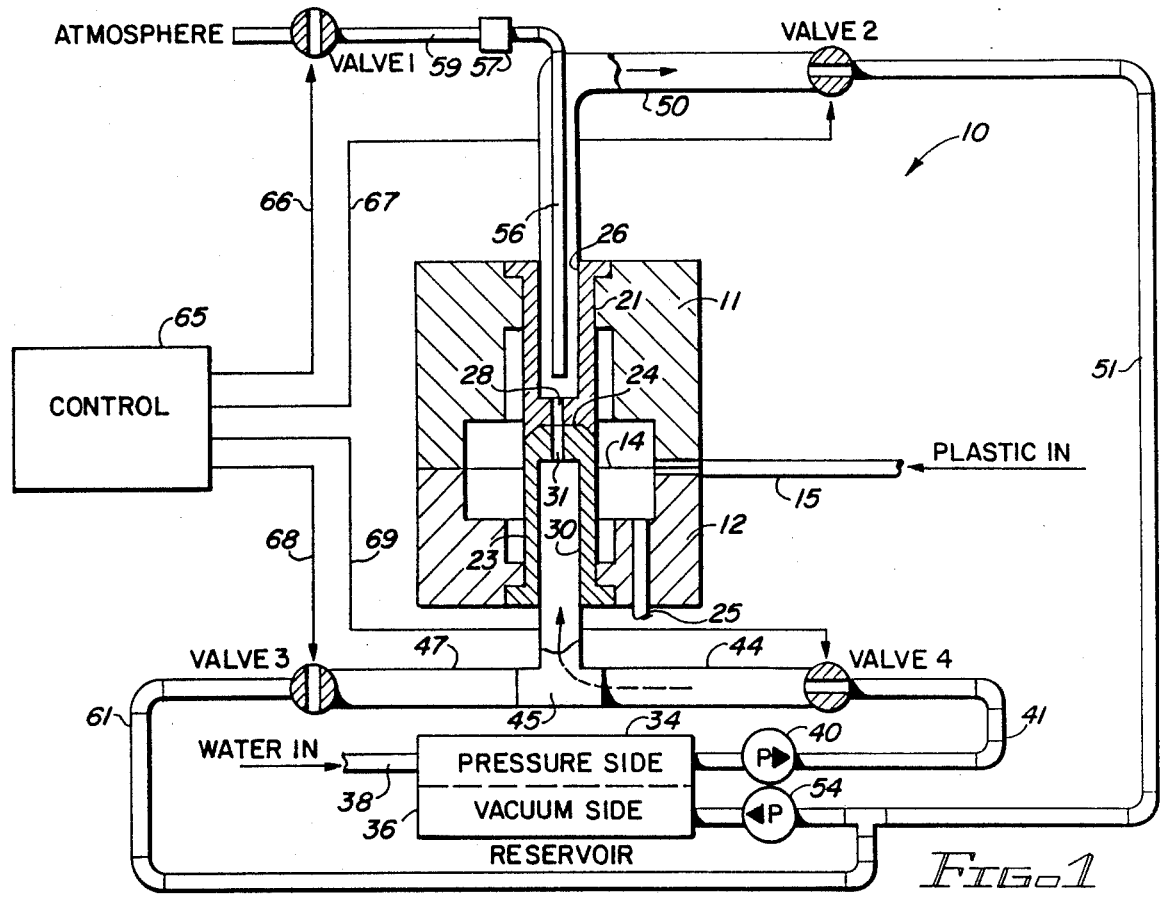
FIGS. 1 through 4 are diagrammatic cross-sectional illustrations of a preferred embodiment of the invention in four different stages of operation.

Reference now should be made to the drawings in which the same reference numbers are used throughout the different figures to designate the same components. FIGS. 1 through 4 are diagrammatic representations of a typical straight-pull molding machine having first and second mating dies and first and second mating core pins used to form precision, hollow injected molded plastic parts. The otherwise standard molding machine of FIGS. 1 through 4 has been modified to incorporate a preferred embodiment of the invention.

Since the overall operation of an injection molding machine is well known and is not changed to incorporate the present invention, the details of operation of the molding machine and the apparatus used to move the two dies 11 and 12 toward and away from one another to close and open the mold, respectively, have not been shown. Any conventional injection molding machine may be used for this purpose. As illustrated in FIGS. 1 through 4, the mold comprises first and second dies 11 and 12, shown in FIG. 1 in the closed position, to form a mold cavity 14 having the configuration of the desired part. During the molding process, hot melted plastic is supplied to the mold cavity 14 through a suitable supply pipe 15. Suitable provisions, not shown, for permitting air to escape from the mold cavity have not been illustrated, since standard techniques may be used for this purpose.

Plastic parts to be manufactured in accordance with the structure shown in FIGS. 1 through 4 have an elongated cylindrical hole or passageway through them from end to end. This passageway is provided by means of mating core pins 21 and 23 which are inserted into and attached to the dies 11 and 12, respectively. These core pins mate at a junction or parting line 24 provided by an inwardly tapered surface on the inner end of the pin 23 which mates with and precisely engages a receiving socket formed on the inner end of the core pin 21 in the die 11.

As illustrated in FIG. 1, the mold is closed and the core pins 21 and 23 tightly engage one another at the line 24. Preferably the core pins 21 and 23 are made of stainless steel and include hollow passageways 26 and 30, respectively, through the greater part of their interiors. These passageways narrow to smaller passageways 28 and 31, respectively, at the ends where the two core pins engage one another within the mold. In the closed position shown in FIGS. 1 and 2, a continuous fluid passage then exists from, for example, the lower end of the core pin 23 through the passageways 30 and 31, and through the passageways 28 and 26 in the core pin 21 completely through the mold cavity; so that liquid cooling fluid may be circulated through both of the core pins 21 and 23 during the molding cycle of operation of the injection molding machine.

Cooling fluid, preferably in the form of distilled water, is obtained from a reservoir which has a pressure side 34 and a vacuum side 36. The water level is maintained by supplying water through an inlet pipe 38, as needed. This may be a float controlled replenishing or any other standard suitable method for maintaining the water supply in the reservoir at a suitable level.

As illustrated in FIG. 1, the mold is closed and ready for the injection of plastic through the input pipe 15 into the mold cavity 14. Water is supplied from the pressure side 34 of the reservoir through a pump 40 and a line 41 to an open VALVE 4. After leaving the valve the water is supplied through an outlet pipe 44 to a "T" 45 from the "T" 45 to the interior passageway 30 of the core pin 23. The "T" 45 is connected to the interior passageway 30 of the core pin 23 by any suitable manner providing a water-tight fitting. Water then flows through the interior passageway 30 of the core pin 23, the restricted passageways 31 and 28, and through the interior passageway 26 of the core pin 21 where it is evacuated through a line 50 and a VALVE 2, also open at this time. The output of VALVE 2 is supplied through a pipe 51 to a vacuum pump 54, which then returns the fluids in the line 51 to the vacuum side 36 of the reservoir. This is a continuous operation during the time the mold is closed and plastic is injected through the pipe 15.

As illustrated in FIG. 1, two other valves, namely VALVE 1 and VALVE 3, are closed at this time. Consequently, the operating condition which is described above continues until the status of one of more of the four valves is changed. Control of the operation of VALVES 1 through 4 is effected by a suitable electronic or pneumatic control system 65. The control lines for opening and closing the four valves are indicated as lines 66, 67, 68 and 69, respectively, for VALVE 1, VALVE 2, VALVE 3, and VALVE 4. All of these valves are simple, electrically operated or pneumatically operated on/off valves.

Figure 2:
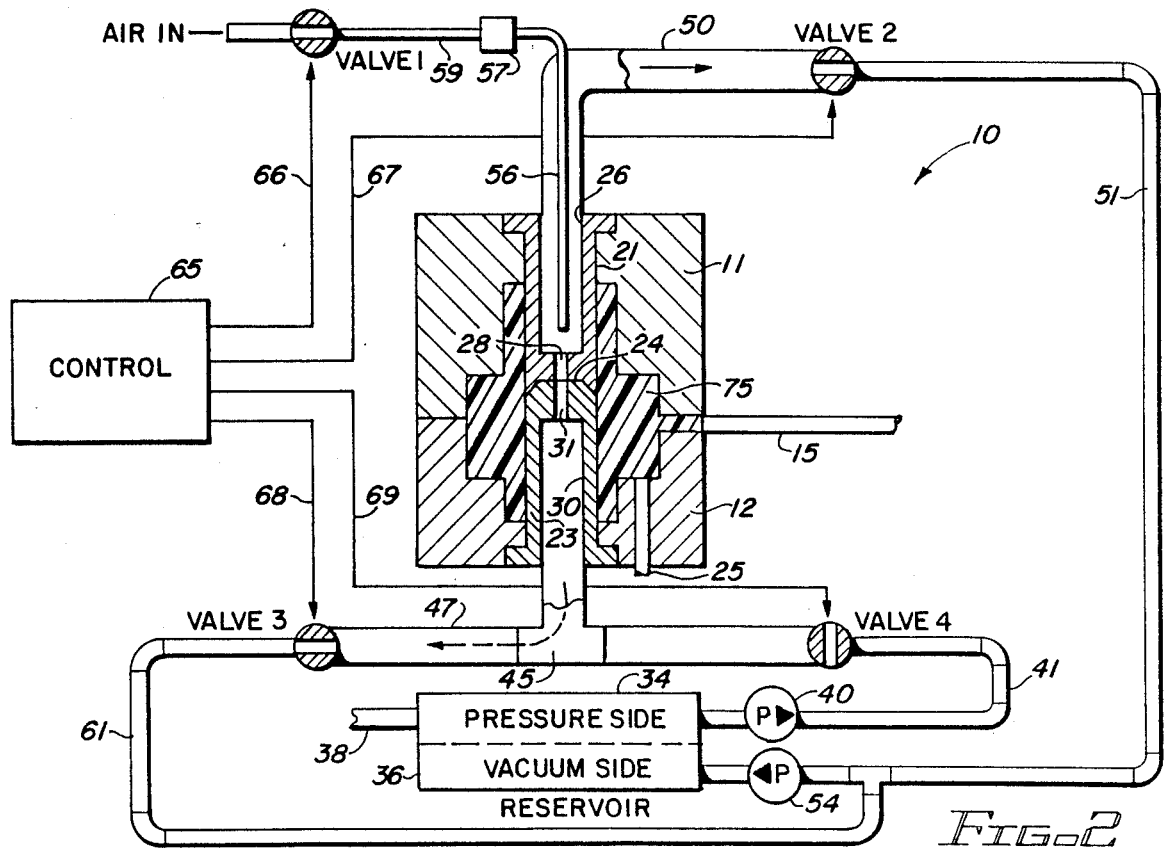

After the mold cavity 14 is filled to form the plastic molded part 75, as illustrated in FIG. 2, the control system 65 provides signals to VALVE 4 to close that valve and to VALVES 1 and 3 to open those valves. As described subsequently, there may be a delay in the opening of VALVE 1 after the opening of VALVE 3, but even if there is a delay, it is relatively short; so that at or just prior to the opening of the mold by moving the dies 11 and 12 apart, all of the states of the various valves are as illustrated in FIG. 2. In this state of operation, no further cooling fluid or cooling water under pressure is supplied, since VALVE 4 is closed and blocks the supply of water through the pipe 41.

The evacuation of cooling liquid or cooling water from the passageway formed through the interiors of the core pins 21 and 23, however, continues to be effected by the operation of the vacuum pump 54 withdrawing fluid through the pipe 50 and the open VALVE 2. In addition, however, a reversal of the fluid flow through the passageways 30 and 31 of the core pin 23 is effected by the opening of VALVE 3 which permits withdrawal or a vacuum pulling of such fluid through VALVE 3 and the pipe 61 to the vacuum pump 54, as illustrated in FIG. 2.

Shortly after the opening of VALVE 3, or simultaneously with it, VALVE 1 is opened by a control signal over the line 66 from the control system 65 to permit air to be pulled from the atmosphere through VALVE 1, the line 59, and a flexible junction 57 into a capillary pipe 56. The pipe 56 is rigidly mounted in the center of the internal passageway 26 in the core pin 21 and terminates at a point close to the juncture of the enlarged passageway 26 with the smaller passageway 28 in the inner end or lower end of the core pin 21, as illustrated in FIG. 2. As a consequence, the vacuum pump 54 first withdraws all of the water which is present in the internal cavities or passageways 26 and 30 by pulling it away from the parting line 24 at the center of the core pins 21 and 23; and purging and drying air is injected near the point 24 by the air supplied through the capillary pipe 56. This air is drawn downwardly through the passageway 30 through VALVE 3 and upwardly through the passageway 26 through VALVE 2 by the pump 54. The air which is injected into the region adjacent the parting line 24 of the core pins 21 and 23 dries any water which may be present in the restricted channels or passageways 28 and 31, so that no dribbling takes place when the mold is parted to eject the part 75.

Figure 3:
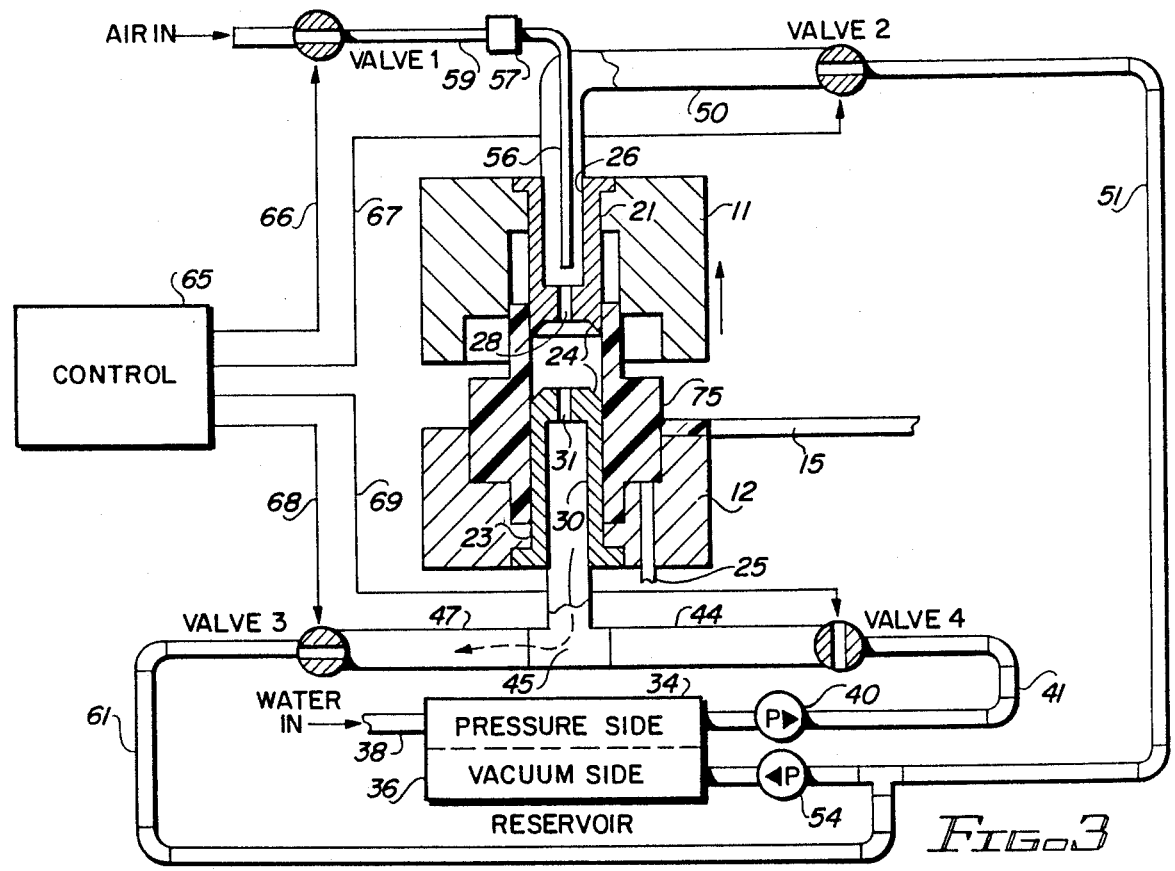

Reference now should be made to FIG. 3 which illustrates the operation of the system during the time the dies 11 and 12 are moved away from one another to open the mold. The condition or operating position of each of the VALVES 1 through 4 is the same as illustrated in FIG. 2 during this time. Consequently, a continuous vacuum pulling of the air away from the parting line 24 at the inner ends of the core pins 21 and 23 continues as the core pins 21 and 23 disengage and move apart, along with the parting of the dies 11 and 12, to permit release of the part 75 from the mold cavity 14. This ensures that no liquid droplets are present at the parting line 24 of the core pins 21 and 23. Thus, no contamination of either the part 75 or the mold takes place.

Figure 4:
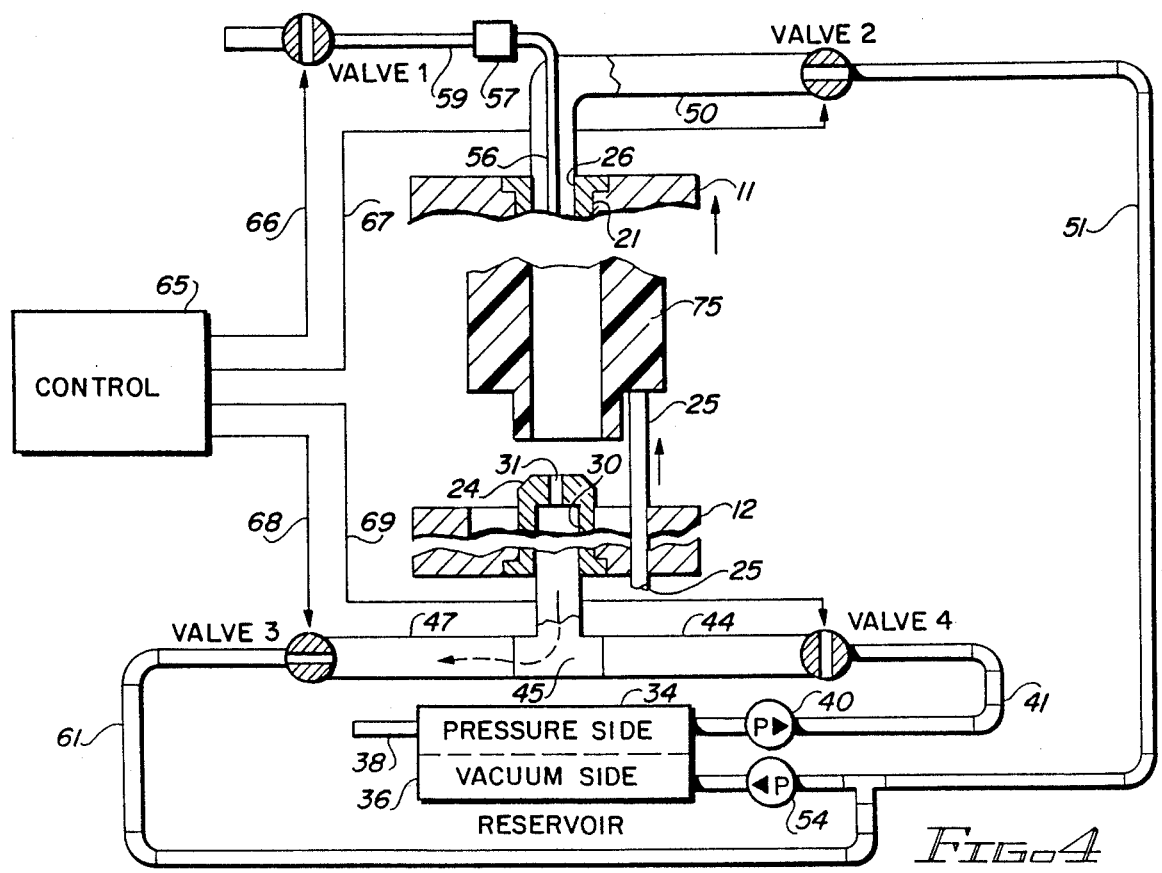

After the dies 11 and 12 are moved fully apart to a distance sufficient to permit ejection of the part 75, the part is ejected by means of a conventional extraction pin 25 to permit the cycle to be repeated. FIGS. 3 and 4 illustrate the steps encountered in the removal of the part 75 from the mold. Since the manner in which this is done is conventional, the apparatus shown in FIGS. 3 and 4 is partially broken away to conserve space. The technique for parting the mold and removing the part 75 is conventional.

It should be noted that the lines 41, 51, 61 and 59 may be flexible lines, or in the alternative, flexible lines may be provided for the lines 44, 47, 50 and the junction 57 with the capillary tube 56 to permit the dies 11 and 12 of the mold to move longitudinally toward and away from one another as illustrated in FIGS. 1 through 4. Flexible water and air lines are well known, and the particular configuration and structure of the molding machine itself will dictate the places where such flexibility is desired and necessary.

After the part 75 has been ejected as illustrated in FIG. 4, the control system 65 applies a signal over the lead 66 to close VALVE 1. VALVE 4 also remains close at this time and VALVES 2 and 3 are open to continue the vacuum evacuation operation through the core pins 21 and 23.

When the part has been ejected, the mold is closed to the position shown in FIG. 1 and the control circuit 65 then operates to close VALVE 3 through a signal over the line 68 and to open VALVE 4 through a control signal over the line 69. The cycle of operation then is repeated.

It should be noted that the structure which is illustrated is shown in enlarged or exaggerated form. To obtain an understanding of typical dimensions which exist in parts for which a commercial embodiment of the invention has been designed, the internal diameter of the passageways 26 and 30 is 0.06 inches. The capillary tube 56 is made of thin walled stainless steel and has an external diameter of 0.03 inches. The passageways 28 and 31 have a diameter of 0.02 inches, and the external diameter of the core pins 21 and 23 is 0.25 inches. These dimensions are not to be considered as limiting, but are actual dimensions incorporated into a working embodiment of the invention for making small precision plastic parts.

Figure 5:
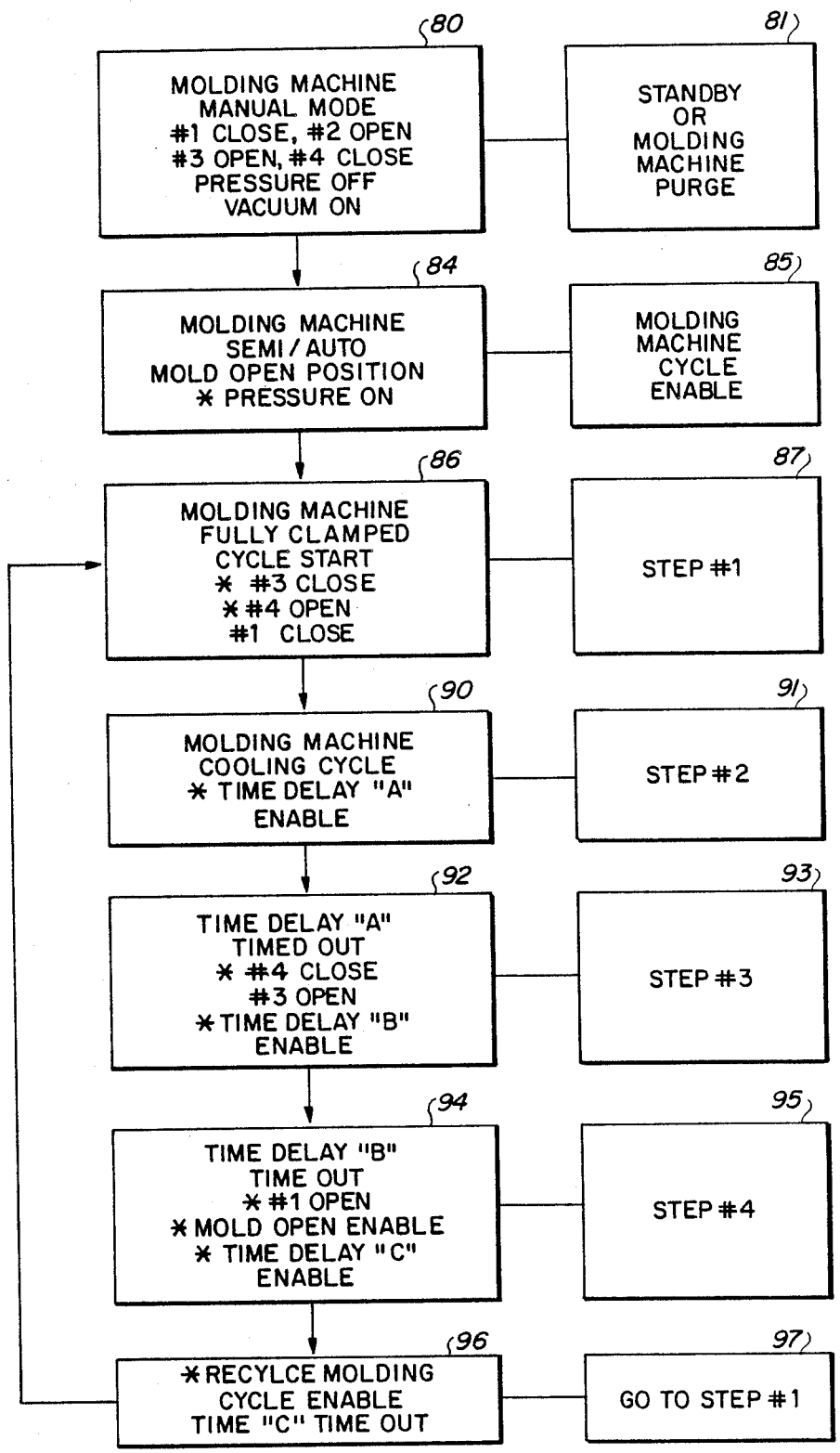
FIG. 5 is a operational flow diagram useful in explaining the operation of the embodiment shown in FIGS. 1 through 4.

Reference now should be made to FIG. 5 which constitutes a flow chart useful in understanding the sequence of operation of the device shown in FIGS. 1 through 4, and described above. In FIG. 5, the references to #1, #2, #3 and #4, refer to the corresponding VALVE 1, VALVE 2, VALVE 3 and VALVE 4 of FIGS. 1 through 4. The machine may be operated in any one of three modes, namely, manual mode, semi-automatic mode, or fully automatic mode.

The manual mode of the machine is illustrated in block 80 and constitutes the stand-by or molding machine purge operation 81 which is effected at the beginning of any molding cycle or periodically as needed during operation of the machine. In this condition of operation, the state of the various valves is that which is indicated in FIG. 4. This is the initial or set up condition of operation which is used prior to operating the mold to produce parts 75. When the molding machine first is turned on, this constitutes its stand-by or purging state of operation.

To prepare the machine for operation, in its semi-automatic "mold open" position 84, the pressure pump 40 is turned on. The state of the valves, however, remains the same as shown in the manual mode 80 or illustrated in FIG. 1. At this stage, the molding machine cycle may be enabled by operation of the control circuit 65. Block 86 then illustrates the operation of the system for the initiation of Step 1 (87) of the molding cycle. In this state of operation, the opened and closed positions of the four different valves is as illustrated in FIG. 1, and the operation is as described in conjunction with FIG. 1.

After the mold cavity 14 has been filled with plastic to form the part 75, a first time delay (A) is effected through the operation of the control circuit 65. This is synchronized with the mechanical operation of the mold itself to provide a time delay "A" of suitable length to permit the plastic used to form the part 75 to solidify or set up. This is considered as Step 2 (90, 91) shown in FIG. 5.

After the time delay "A" has been effected, Step 3 (92, 93) takes place. At this time, VALVE 4 is closed and VALVE 3 is opened, as illustrated in FIG. 2 of the drawing. A time delay "B" is initiated at this time in the control circuit 65 to begin the vacuum purging of the cooling water out of the outer ends of the cavities in both of the core pins 21 and 23.

Time delay "B" is relatively short; and at the end of that time delay, the control circuit 65 causes VALVE 1 to be opened. This is indicated in Step 4 (94, 95) of FIG. 5. This is the condition of operation which is shown in FIG. 3 of the drawing. A time delay "C" is effected at this step of operation by the control circuit 65 operating in synchronism with the mechanical operation of the molding machine. At the end of the time delay "C" (96, 97) the part 75 has been ejected, as illustrated in FIG. 4 of the drawing; and Step 1 is resumed, as illustrated at 86,87. The cycle of operation repeats, this cycle continuously is repeated throughout the automatic operation of the machine until no further parts are to be made and operation is terminated.

The machine and method described has resulted in a significant quality improvement of the parts produced. In addition, an improvement of 30% to 40% has been obtained in the cycle time.

The foregoing description of a preferred embodiment of the invention, as illustrated in the structure shown in FIGS. 1 through 4 and as described in the functional flow chart of FIG. 5, is to be considered as illustrative of the invention and not as limiting. For example, if desired, capillary air pipes corresponding to the pipe or tube 56 may be inserted into the interiors of both of the core pins 21 and 23, instead of only one of the core pins, as illustrated. The different dimensions which have been given for the various parts also may be changed by those skilled in the art without departing from the scope of the invention. In addition, the materials out of which various parts are made, may be varied in accordance with particular applications encountered and according to the operating characteristics which are desired. Various other changes and modifications will occur to those skilled in the art without departing from the true scope of the invention as set forth in the appended claims.

What is claimed is:

1. A flow-through core cooling apparatus for an injection molding machine used to produce hollow parts, said apparatus including in combination:
   first and second mold dies forming a mold cavity and mounted for relative movement toward and away from one another to respectively close and open said mold cavity;
   first and second hollow core members attached to said first and second mold dies, respectively, and moveable between respective engaged and disengaged positions, said first and second hollow core members each having first and second ends and each extending into said mold cavity with the first ends thereof matingly engaging one another when said mold cavity is closed to form a continuous fluid passageway therethrough;
   means for supplying a source of cooling fluid through said fluid passageway when said mold cavity is closed;
   a vacuum fluid removal means coupled with the second ends of said first and second hollow core members for removing fluid therefrom by applying a vacuum to the second ends thereof when said first and second hollow core members are moved from the engaged position thereof away from one another to the disengaged position; and
   an air supply tube extending through the interior of one of said first and second core members and terminating at a point adjacent the first end of said one of said first and second hollow core members for supplying air to a point adjacent the first end of said one of said first and second core members when said core members move away from one another from the engaged position thereof to the disengaged position thereof.

2. A flow-through core cooling apparatus for an injection molding machine used to produce hollow parts, said apparatus including in combination:
   first and second mold dies forming a mold cavity and mounted for relative movement toward and away from one another to respectively close and open said mold cavity;
   first and second hollow core members attached to said first and second mold dies, respectively, and moveable between respective engaged and disengaged positions, said first and second hollow core members each having first and second ends and each extending into said mold cavity with the first ends thereof matingly engaging one another when said mold cavity is closed to form a continuous fluid passageway therethrough;
   means for supplying a source of cooling fluid through said fluid passageway when said mold cavity is closed;
   a vacuum fluid removal means coupled with the second ends of said first and second hollow core members for removing fluid therefrom by applying a vacuum to the second ends thereof when said first and second hollow core members are moved from the engaged position thereof away from one another to the disengaged position thereof; and
   a capilliary tube extending through the interior of one of said first and second hollow core members and terminating at a point adjacent the first end of said one of said first and second hollow core members for supplying air through the second end of said one of said first and second hollow core members to a point adjacent the first end of said one of said first and second hollow core members when said first and second core members move away from one another from the engaged position thereof to the disengaged position thereof.

3. The apparatus according to claim 2 further including control means for blocking said air supply when cooling fluid is supplied through said passageway with said core members engaged and for terminating the supply of cooling fluid and enabling the supply of air when said first and second core members are moved away from one another from the engaged position to the disengaged position thereof.

4. A flow-through core cooling apparatus for an injection molding machine used to produce hollow parts, said apparatus including in combination:

first and second mold dies forming a mold cavity and mounted for relative movement toward and away from one another to respectively close and open said mold cavity;

first and second hollow core members attached to said first and second mold dies, respectively, and moveable therewith, said first and second hollow core members each having first and second ends, with the first ends thereof each extending into said mold cavity and with said first ends matingly engaging one another with said mold cavity closed to form a continuous fluid passageway through said first and second hollow core members;

a source of liquid cooling fluid;

means for supplying liquid cooling fluid under pressure from said source of liquid cooling fluid to the second end of said first core member;

first means for removing fluid from the second end of said second core member;

normally closed air supply means including an air supply tube extending through the interior of one of said hollow core members and terminating near the first end thereof for supplying air through the second end of one of said first and second core members to a point adjacent the first end thereof;

second normally closed fluid removal means for removing fluid from the second end of said first core member; and control means coupled with said means for supplying liquid cooling fluid, said normally closed air supply means and said second fluid removal means, for operating said liquid cooling fluid supply means to terminate the supply of fluid therefrom and opening said air supply means and said normally closed fluid removal means at the time said first and second mold dies move away from one another from a closed position to an open position thereof.

5. The apparatus according to claim 4 wherein said first and second fluid removal means include vacuum removal means.

6. The apparatus according to claim 5 wherein said air supply means comprises a first valve, having open and closed positions of operation, operated by said control means, and said air supply tube extends through the interior of said second hollow core member, such that in the open position of said first valve, said tube is coupled to receive atmospheric air.

7. The apparatus according to claim 6 wherein said means for supplying liquid cooling fluid under pressure includes a cooling fluid supply valve coupled to said source of fluid and operated by said control means.

8. The apparatus according to claim 4 wherein said second normally closed fluid removal means includes a fluid removal valve, coupled to and operated by said control means, and a vacuum line; and with said second fluid removal valve means in the open position thereof, said vacuum line withdraws fluid from the second end of said first hollow core member through said fluid removal valve.

9. The apparatus according to claim 4 wherein said air supply means comprises a first valve, having open and closed positions of operation, operated by said control means, and said air supply tube extends through the interior of said second hollow core member, such that in the open position of said first valve, said tube is coupled to receive atmospheric air.

10. The apparatus according to claim 4 wherein said means for supplying liquid cooling fluid under pressure includes a cooling fluid supply valve coupled to said source of fluid and operated by said control means.

* * * * *